(12) United States Patent
Wang

(10) Patent No.: US 7,970,277 B1
(45) Date of Patent: Jun. 28, 2011

(54) BUSINESS CARD CASE MOUNTABLE ON NOTEBOOK COMPUTER

(75) Inventor: Ching-Chung Wang, Taipei (TW)

(73) Assignee: Primax Electronics Ltd., Taipei (TW)

( * ) Notice: Subject to any disclaimer, the term of this patent is extended or adjusted under 35 U.S.C. 154(b) by 0 days.

(21) Appl. No.: 12/692,924

(22) Filed: Jan. 25, 2010

(30) Foreign Application Priority Data

Dec. 11, 2009 (TW) ................................ 98142463 A

(51) Int. Cl.
*G03B 17/48* (2006.01)
*H04N 5/225* (2006.01)
*G06F 1/16* (2006.01)
*H05K 5/00* (2006.01)

(52) U.S. Cl. ............... 396/429; 348/207.1; 348/552; 361/679.27

(58) Field of Classification Search ............ 396/429; 348/207.1, 552; 351/679.27; 361/679.27
See application file for complete search history.

(56) References Cited

U.S. PATENT DOCUMENTS

2010/0038514 A1* 2/2010 Yu et al. ................ 248/449

* cited by examiner

*Primary Examiner* — Rochelle-Ann J Blackman
(74) *Attorney, Agent, or Firm* — Kirton & McConkie; Evan R. Witt

(57) ABSTRACT

A business card case is mountable on a notebook computer. The business card case has a receptacle for storing plural business cards. The business card case includes a protrusion part, a supporting part and a restriction structure. The protrusion part is inserted in a recess of a base of the notebook computer, so that the business card case is fixed on the notebook computer. The business card to be shot by an image pickup device of the notebook computer is supported on the supporting part. By adjusting the restriction structure of the business card case and rotating said upper cover of the notebook computer, a better shooting angle is defined between the image pickup device and the document.

5 Claims, 6 Drawing Sheets

BUSINESS CARD CASE MOUNTABLE ON NOTEBOOK COMPUTER

FIELD OF THE INVENTION

The present invention relates to a business card case, and more particularly to a business card case mountable on a notebook computer.

BACKGROUND OF THE INVENTION

Notebook computers have experienced great growth and are now rapidly gaining in popularity. Due to the advantages of small size, light weightiness and easy portability, notebook computers become essential components for the businessmen when travelling to other places or taking part in meetings. With the maturity of digitization techniques, the commercially available notebook computer is usually equipped with an image pickup device such as a web camera or a camera. The desired images could be acquired by the image pickup device. Recently, the image scanner is gradually replaced by the image pickup device.

For example, after the user has visited customers or taken part in a meeting, the basic information associated with the business cards of the customers or conferees needs to be filed in order to quickly search the basic information in the further. For convenience, after the image of the card is acquired by the image pickup device, the image data can be immediately recognized or filed by associated software or hardware components of the notebook computer. As such, the information associated with the business card is digitized. Moreover, it is also convenient to acquire the images of other documents having size similar to the business card by the image pickup device of the notebook computer. Another example of the document includes but is not limited to a photograph, a credit card, a debit card, an identification card, an envelope, a postcard, a ticket card, a notepaper, a bookmark and the like.

When an image pickup device of a notebook computer is used to acquire the image of a document, some difficulties possibly occur. For example, it is critical to hold the document steady. For acquiring the image of an article contained in the document by the image pickup device of the notebook computer, if this document is held by the user's hand, the document is readily rocked due to the long holding time. Under this circumstance, the obtained document image is usually blurred. For preventing from rocking of the document and thus obtaining a sharp document image, a static document stand is used for holding the document steady.

The use of the document stand, however, incurs another problem. For example, in a case that the document stand is used in other places, the user should carry the notebook computer and the document stand at the same time, which is very troublesome to the user.

SUMMARY OF THE INVENTION

The present invention relates to a business card case, and more particularly to a business card case having a document holding function for facilitating a notebook computer to acquiring an image of a document.

In accordance with an aspect of the present invention, there is provided a business card case mountable on a notebook computer for facilitating the notebook computer to acquire an image of a document. The business card case includes a first housing, a second housing, a protrusion part and a supporting part. The second housing movably is coupled with the first housing, so that a relation between the first housing and the second housing is in either an open status or a closed status. When the relation between the first housing and the second housing is in the closed status, a receptacle is defined by the first housing and the second housing for storing plural business cards. The protrusion part is arranged at an edge of the first housing. The supporting part is disposed on the second housing for supporting the document. The notebook computer includes an upper cover and a base. The base is pivotally coupled with the upper cover. The upper cover has an image pickup device for acquiring the image of the document. The base has a recess for accommodating the protrusion part. By rotating the upper cover, a shooting angle is defined between the image pickup device and the document supported on the supporting part.

In an embodiment, the first housing and the second housing have rectangular shapes. A first elongate sliding groove and a second elongate sliding groove are respectively formed in two opposite parallel sides of the first housing. A first sliding block and a second sliding block are respectively formed on two opposite parallel sides of the second housing. The first sliding block and the second sliding block are respectively received in the first elongate sliding groove and the second elongate sliding groove, so that the first sliding block and the second sliding block are respectively movable along the first elongate sliding groove and the second elongate sliding groove.

In an embodiment, the business card case further includes a restriction structure, and the restriction structure facilitates fixing the second housing on the first housing when the relation between the first housing and the second housing is in the open status.

In an embodiment, the restriction structure is formed within the first elongate sliding groove and the second elongate sliding groove. The restriction structure includes plural bulges for stopping the first sliding block and the second sliding block, so that first sliding block and the second sliding block fail to be separately moved along the first elongate sliding groove and the second elongate sliding groove.

In an embodiment, both ends of the first sliding block and both ends of the second sliding block are arch-shaped. In response to a pushing force applied on the second housing the first sliding block and the second sliding block are pushed forward to overcome the hindrance of the bulges.

In an embodiment, a stopping part is disposed on the first edge of the first housing for preventing the plural business cards from falling off the business card case.

In an embodiment, an arc-shaped notch is further formed in a second edge of the first housing.

In an embodiment, a guiding part is further disposed on the second edge of the first housing for guiding a user to place the plural business card into the business card case or removing the plural business card from the business card case.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1A:
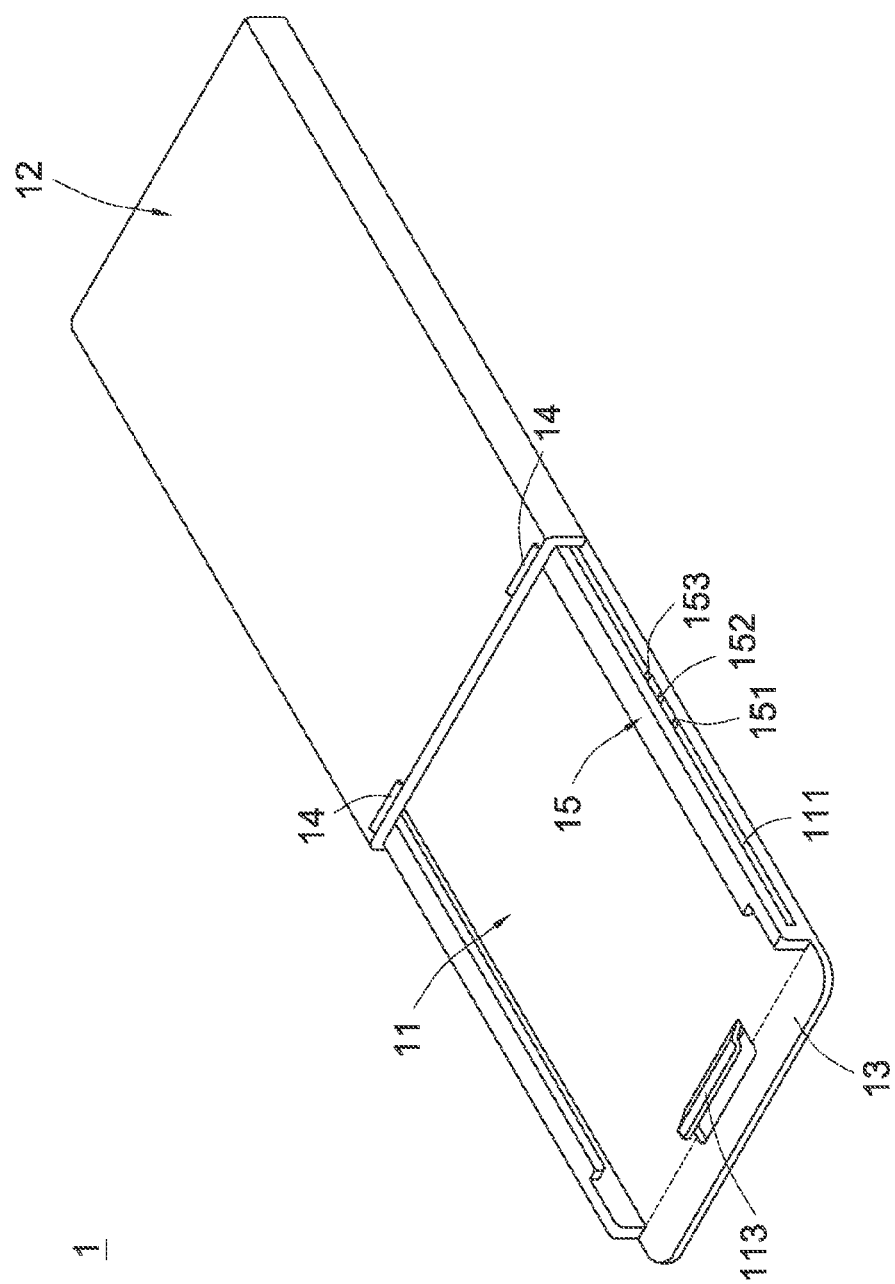
FIG. 1A is a schematic perspective view illustrating a business card case mountable on a notebook computer according to an embodiment of the present invention.
Figure 1B:
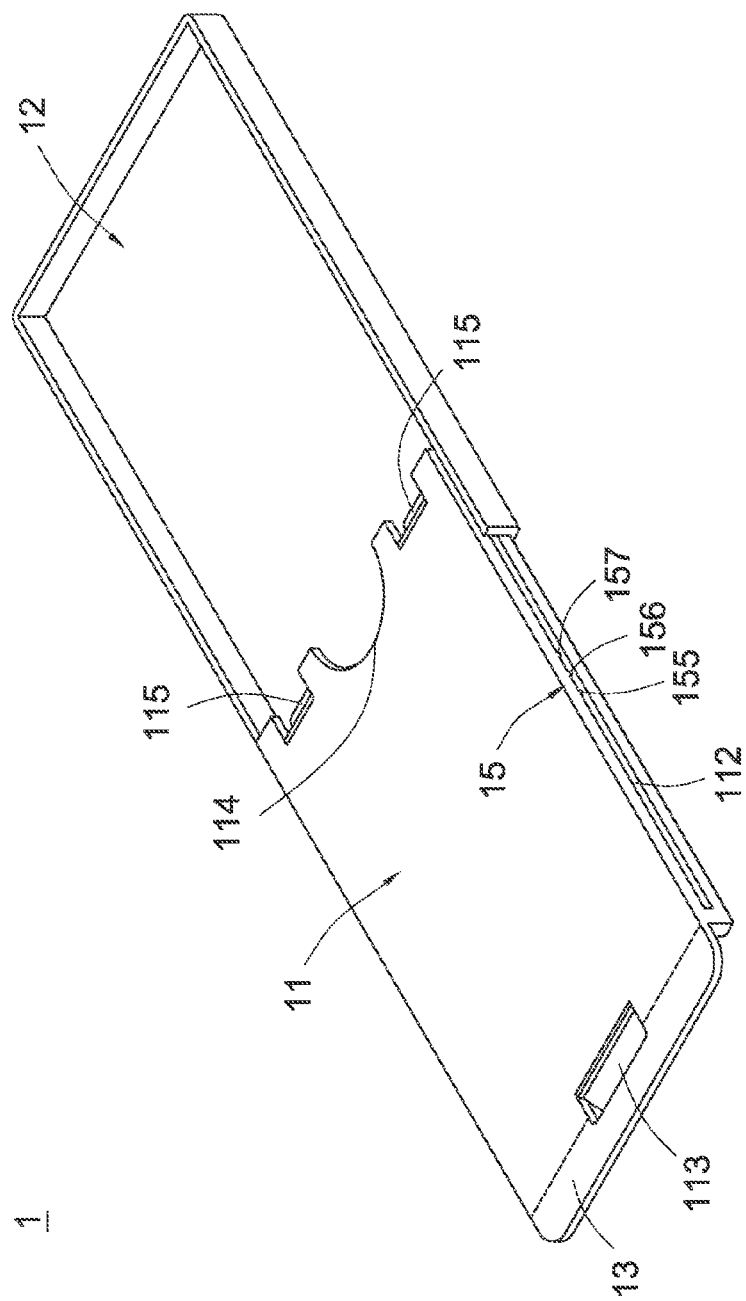
FIG. 1B is a schematic perspective view illustrating the business card case shown in FIG. 1A and taken from another viewpoint.
Figure 2A:
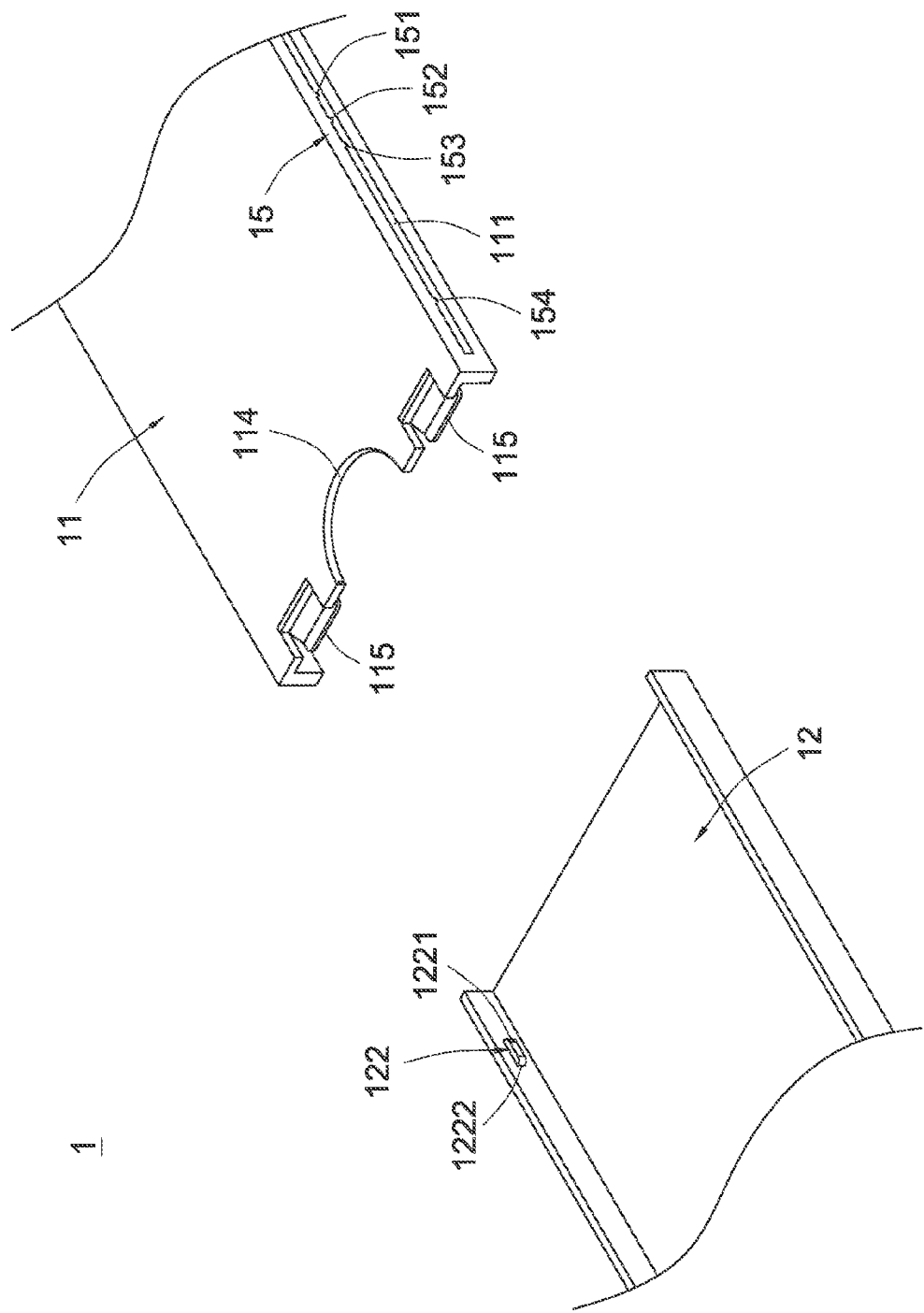
FIG. 2A is a schematic exploded view illustrating a business card case mountable on a notebook computer according to an embodiment of the present invention.
Figure 2B:
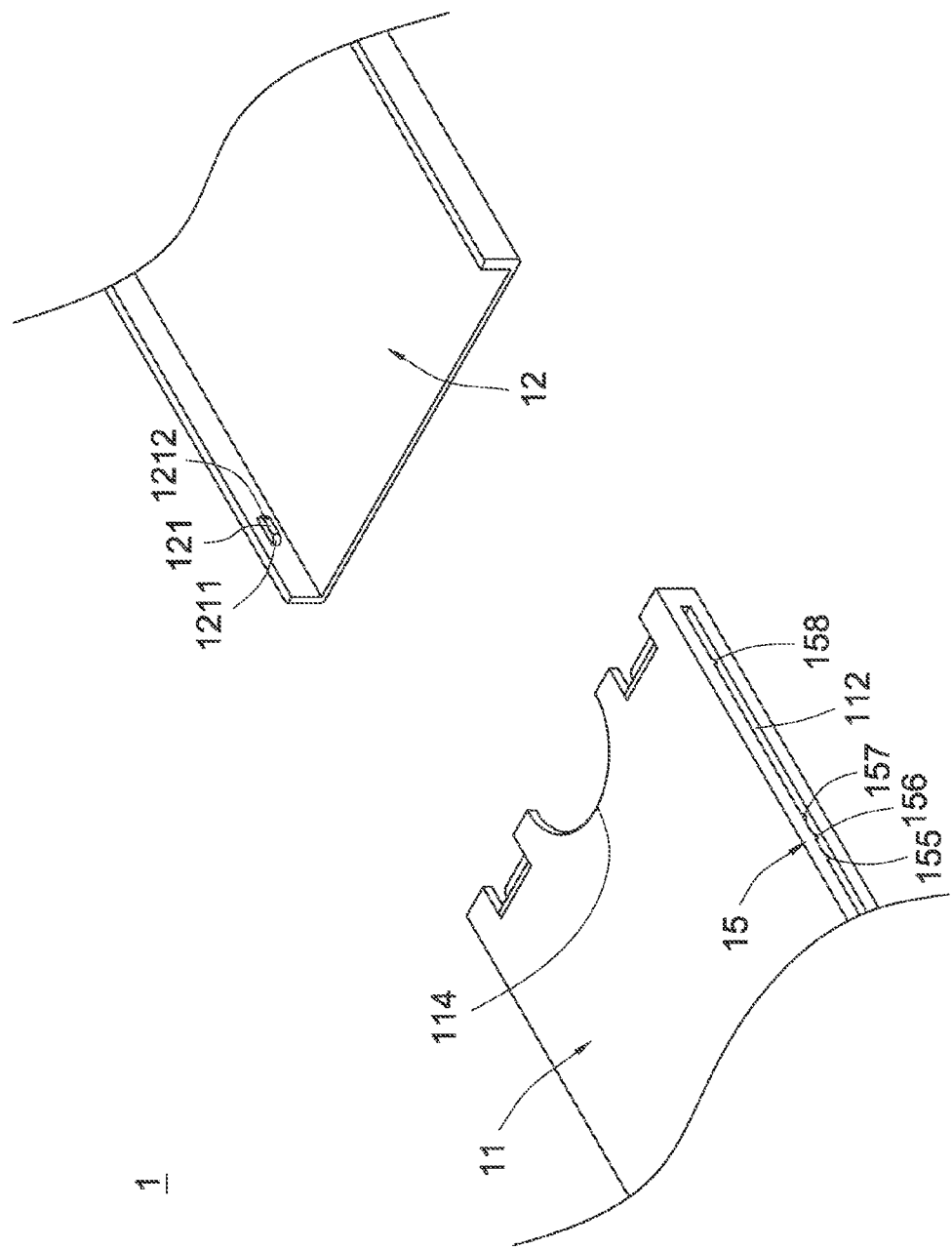
FIG. 2B is a schematic exploded view illustrating the business card case shown in FIG. 2A and taken from another viewpoint.

FIG. 1A is a schematic perspective view illustrating a business card case mountable on a notebook computer according to an embodiment of the present invention. FIG. 1B is a schematic perspective view illustrating the business card case shown in FIG. 1A and taken from another viewpoint. FIG. 2A is a schematic exploded view illustrating a business card case mountable on a notebook computer according to an embodiment of the present invention. FIG. 2B is a schematic exploded view illustrating the business card case shown in FIG. 2A and taken from another viewpoint.

Please refer to FIGS. 1A, 1B, 2A and 2B. The business card case 1 comprises a first housing 11, a second housing 12, a protrusion part 13 and a supporting part 14. The first housing 11 and the second housing 12 have rectangular shapes. A first elongate sliding groove 111 and a second elongate sliding groove 112 are respectively formed in two opposite parallel sides of the first housing 11. Corresponding to the first elongate sliding groove 111 and a second elongate sliding groove 112, a first sliding block 121 and a second sliding block 122 are respectively formed on two opposite parallel sides of the second housing 12. The first sliding block 121 and the second sliding block 122 are respectively received in the first elongate sliding groove 111 and the second elongate sliding groove 112, so that the second housing 12 is movably coupled with the first housing 11. Since the first housing 11 and the second housing 12 are movable with respect to each other, the relation between the first housing 11 and the second housing 12 is in either an open status or a closed status. In a case that the relation between the first housing 11 and the second housing 12 is in the open status, the user may place plural business cards in the internal portion of the first housing 11. Whereas, in a case that the relation between the first housing 11 and the second housing 12 is in the closed status, a receptacle is defined by the first housing 11 and the second housing 12, and the plural business cards are stored within the receptacle. Moreover, the protrusion part 13 of the business card case 1 is arranged at a first edge of the first housing 11, and the supporting part 14 is disposed on the second housing 12.

In addition to the protrusion part 13, a stopping part 113 is disposed on the first edge of the first housing 11 for preventing the plural business cards placed within the first housing 11 from falling off the business card case 1. An arc-shaped notch 114 is formed in a second edge of the first housing 11. When the relation between the first housing 11 and the second housing 12 is in the closed status, the user's finger may externally move the business card that is the nearest to the arc-shaped notch 114, so that the business card can be removed from the receptacle without difficulty. In addition, a guiding part 115 is also disposed on the second edge of the first housing 11. During the process of removing the business card from the receptacle, the business card is guided by the guiding part 115, so that the possibility of causing collision between the business card and the inner wall of the first housing 11 is minimized.

Figure 3A:
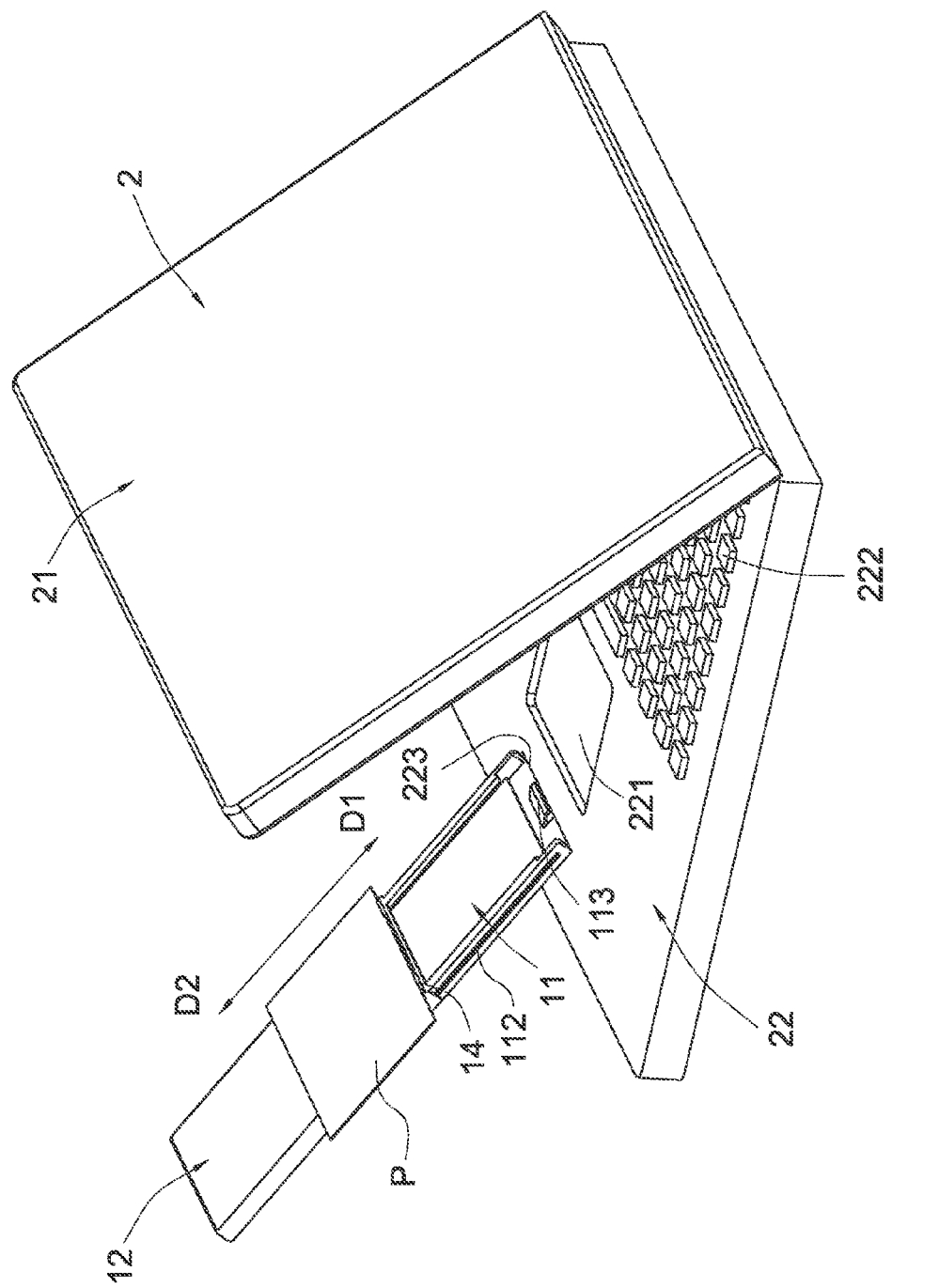
FIG. 3A is a schematic perspective view illustrating a business card case mounted on a notebook computer according to an embodiment of the present invention.
Figure 3B:
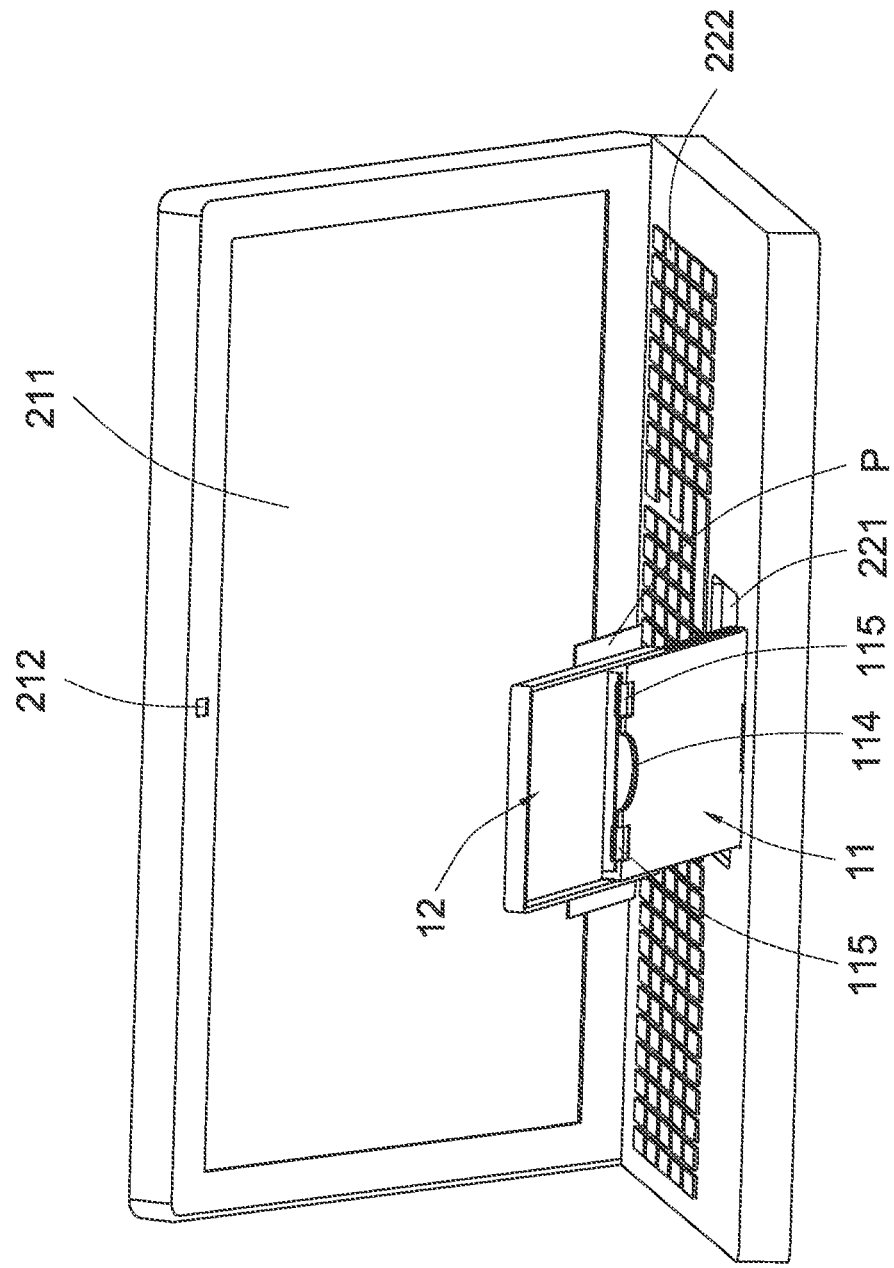
FIG. 3B is a schematic perspective view illustrating the business card case mounted on the notebook computer shown in FIG. 3A and taken from another viewpoint.

Hereinafter, the operating principle of the business card case 1 will be illustrated with reference to FIGS. 3A and 3B. FIG. 3A is a schematic perspective view illustrating a business card case mounted on a notebook computer according to an embodiment of the present invention. FIG. 3B is a schematic perspective view illustrating the business card case mounted on the notebook computer shown in FIG. 3A and taken from another viewpoint. The notebook computer 2 comprises an upper cover 21 and a base 22. The upper cover 21 is pivotally coupled with the base 22. The upper cover 21 comprises a screen 211 and an image pickup device 212. The image pickup device 212 is disposed on an upper rim of the screen 211 for acquiring an image of a document. After the image of the document is acquired by the image pickup device 212, the document image is shown on the screen 211. In addition, the image data could be recognized, filed or stored by associated software or hardware components of the notebook computer 2. The base 22 of the notebook computer 2 further comprises a touchpad 221, a keyboard 222 and a recess 223. The touchpad 221 is served as a pointing device. Via the keyboard 222, the user can input characters into the notebook computer 2. The recess 223 is used for accommodating the protrusion part 13 of the business card case 1.

After the user has visited customers or taken part in a meeting, the basic information associated with the business cards of the customers or conferees can be filed. For filing the basic information associated with the business cards, the protrusion part 13 of the business card case 1 is firstly inserted into the recess 223 of the base 22 of the notebook computer 2, so that the business card case 1 is fixed on the notebook computer 2. Next, the business card P to be files in placed on the supporting part 14, which is disposed on the second housing 12. By rotating the upper cover 21, a shooting angle is defined between the image pickup device 212 and the business card P supported on the supporting part 14. The document to be placed on the supporting part 14 of the second housing 12 and acquired by the image pickup device 212 for filing is not restricted to the business card P. Another example of the document includes but is not limited to a photograph, a credit card, a debit card, an identification card, an envelope, a postcard, a ticket card, a notepaper, a bookmark and the like.

For creating a better shooting angle is defined between the image pickup device 212 and the business card P, the second housing 11 of the business card case 1 may be moved in the direction D1 or D2 such that the height of the business card P placed on the second housing 12 is adjustable. As such, a sharp image of the business card P can be acquired by the image pickup device 212. The business card case 1 further comprises a restriction structure 15 for facilitating fixing the second housing 12 on the first housing 11. Please refer to FIGS. 1 and 2 again. The restriction structure 15 comprises plural bulges 151~158. The bulges 151~154 are formed in the first elongate sliding groove 111. Corresponding to the bulges 151~154, the bulges 155~158 are formed within the second elongate sliding groove 112. The first sliding block 121 and the second sliding block 122 may be stopped by the bulges 151..158. As such, the first sliding block 121 and the second sliding block 122 fail to be separately moved along the first elongate sliding groove 111 and the second elongate sliding groove 112.

In particular, depending on the shooting conditions, the first housing 11 and the second housing 12 may be located in different position-restricting statuses. For example, originally, the first sliding block 121 and the second sliding block 122 are respectively stopped by the bulges 151 and 155. For ascending the shooting height of the business card P, the user may move the second housing 12 such that the first sliding block 121 and the second sliding block 122 are respectively stopped by the bulges 152 and 156, the bulges 153 and 157, or the bulges 154 and 158. In some embodiments, after the protrusion part 13 of the business card case 1 is inserted into the recess 223 of the notebook computer 2, the position-restricting statuses of the restriction structure 15 may be adjusted according to the size of the notebook computer 2. As a consequence, a proper shooting height is determined for complying with the size of the notebook computer 2. For example, the first sliding block 121 and the second sliding block 122 are respectively stopped by the bulges 151 and 155 when the business card case 1 is inserted into the recess 223 of a 12-inch notebook computer. In addition, the first sliding block 121 and the second sliding block 122 are respectively stopped by the bulges 152 and 156 when the business card case 1 is inserted into the recess 223 of a 14-inch notebook computer. In addition, the first sliding block 121 and the second sliding block 122 are respectively stopped by the bulges 153 and 157 when the business card case 1 is inserted into the recess 223 of a 15-inch notebook computer. The above embodiments are illustrated by referring to the restriction structure 15 having the bulges 151~158. Nevertheless, the locations and numbers of the bulges of the restriction structure 15 may be altered according to the practical requirements.

Moreover, the both ends 1211 and 1212 of the first sliding block 121 and the both ends 1221 and 1222 of the second sliding block 122 are arch-shaped. For eliminating the position-restricting status between the first housing 11 and the second housing 12 or changing the position-restricting status between the first housing 11 and the second housing 12, the user may apply a pushing force on the second housing 12. In response to the pushing force, the first sliding block 121 and the second sliding block 122 are pushed forward to overcome the hindrance of the bulges 151~158.

From the above description, the business card case of the present invention can be mounted on a notebook computer. The business card case has a function of storing business cards. In addition, the business card case also has a function of holding a document when the image of the document is acquired by the image pickup device of the notebook computer. That is, the user does not need to carry an additional document stand when the notebook computer is used in mobile commerce. The use of the business card case may facilitate the notebook computer to acquire the image of the document (e.g. a business card). After the image of the business card is acquired by the image pickup device, the image data could be recognized, filed or stored by associated software or hardware components of the notebook computer. After these actions are completed, the business card may be stored in the business card case in order to reduce the burden and cost of storing the business card.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A business card case mountable on a notebook computer for facilitating said notebook computer to acquire an image of a document, said business card case comprising:
    a first housing;
    a second housing movably coupled with said first housing, so that a relation between said first housing and said second housing is in either an open status or a closed status, wherein when said relation between said first housing and said second housing is in said closed status, a receptacle is defined by said first housing and said second housing for storing plural business cards, wherein said first housing and said second housing have rectangular shapes, a first elongate sliding groove and a second elongate sliding groove are respectively formed in two opposite parallel sides of said first housing, a first sliding block and a second sliding block are respectively formed on two opposite parallel sides of said second housing, and said first sliding block and said second sliding block are respectively received in said first elongate sliding groove and said second elongate sliding groove, so that said first sliding block and said second sliding block are respectively movable along said first elongate sliding groove and said second elongate sliding groove;
    a restriction structure, and said restriction structure facilitates fixing said second housing on said first housing when said relation between said first housing and said second housing is in said open status, wherein said restriction structure is formed within said first elongate sliding groove and said second elongate sliding groove, wherein said restriction structure comprises plural bulges for stopping said first sliding block and said second sliding block, so that first sliding block and said second sliding block fail to be separately moved along said first elongate sliding groove and said second elongate sliding groove;
    a protrusion part arranged at an edge of said first housing; and
    a supporting part disposed on said second housing for supporting said document, wherein said notebook computer comprises an upper cover and a base pivotally coupled with said upper cover, said upper cover has an image pickup device for acquiring said image of said document, and said base has a recess for accommodating said protrusion part, wherein by rotating said upper cover, a shooting angle is defined between said image pickup device and said document supported on said supporting part.

2. The business card case mountable on a notebook computer according to claim 1 wherein both ends of said first sliding block and both ends of said second sliding block are arch-shaped, wherein in response to a pushing force applied on said second housing said first sliding block and said second sliding block are pushed forward to overcome the hindrance of said bulges.

3. The business card case mountable on a notebook computer according to claim 1 wherein a stopping part is disposed on said first edge of said first housing for preventing said plural business cards from falling off said business card case.

4. A business card case mountable on a notebook computer for facilitating said notebook computer to acquire an image of a document, said business card case comprising:
    a first housing, wherein an arc-shaped notch is further formed in a second edge of said first housing;
    a second housing movably coupled with said first housing, so that a relation between said first housing and said second housing is in either an open status or a closed status, wherein when said relation between said first housing and said second housing is in said closed status, a receptacle is defined by said first housing and said second housing for storing plural business cards;

a protrusion part arranged at an edge of said first housing; and a supporting part disposed on said second housing for supporting said document, wherein said notebook computer comprises an upper cover and a base pivotally coupled with said upper cover, said upper cover has an image pickup device for acquiring said image of said document, and said base has a recess for accommodating said protrusion part, wherein by rotating said upper cover, a shooting angle is defined between said image pickup device and said document supported on said supporting part.

5. The business card case mountable on a notebook computer according to claim 4 wherein a guiding part is further disposed on the second edge of the first housing for guiding a user to place said plural business card into said business card case or remove said plural business card from said business card case.

* * * * *